United States Patent [19]

Benazzi et al.

[11] Patent Number: 6,077,420
[45] Date of Patent: Jun. 20, 2000

[54] PROCESS FOR CRACKING HYDROCARBON FEEDS USING A CATALYST COMPRISING A DEALUMINATED NU-86 ZEOLITE

[75] Inventors: Eric Benazzi, Chatou; Hervé Cauffriez, Bougival, both of France

[73] Assignee: Institut Francais du Petrole, Rueil Malmaison Cedex, France

[21] Appl. No.: 09/008,837

[22] Filed: Jan. 20, 1998

[30] Foreign Application Priority Data

Jan. 20, 1997 [FR] France .................................. 97/00620

[51] Int. Cl.⁷ .................................................. C10G 11/05
[52] U.S. Cl. ...................................... 208/120.01; 208/113
[58] Field of Search ............................... 208/113, 120.01, 208/120.35

[56] References Cited

U.S. PATENT DOCUMENTS 5,108,579   4/1992   Casci .......................................... 208/46
5,242,676   9/1993   Apelian et al. .......................... 423/714

FOREIGN PATENT DOCUMENTS 0 463 768   5/1985   European Pat. Off. .
0 463 768   1/1992   European Pat. Off. .

*Primary Examiner*—Walter D. Griffin
*Attorney, Agent, or Firm*—Millen, White, Zelano & Branigan, P.C.

[57] ABSTRACT

The present invention relates to the use of a catalyst comprising a Y zeolite with a faujasite structure combined with a NU-86 zeolite which is dealuminated and at least partially in its acid form and a matrix which is normally amorphous or of low crystallinity in a process for catalytic cracking of petroleum feeds.

19 Claims, No Drawings

PROCESS FOR CRACKING HYDROCARBON FEEDS USING A CATALYST COMPRISING A DEALUMINATED NU-86 ZEOLITE

FIELD OF THE INVENTION

The present invention relates to the use of a catalyst comprising a Y zeolite with a faujasite structure combined with a NU-86 zeolite which is dealuminated and at least partially in its acid form and a matrix which is normally amorphous or of low crystallinity in a process for catalytic cracking of petroleum feeds. Such a process, which is particularly suitable for cracking heavy petroleum fractions, can crack petroleum fractions to produce a large quantity of compounds containing 3 and/or 4 carbon atoms per molecule, more particularly propylene and isobutane.

BACKGROUND OF THE INVENTION

Cracking hydrocarbon feeds to obtain high yields of very good quality motor gasoline was begun in the petroleum industry at the end of the 1930s. The introduction of fluid bed processes (FCC, Fluid Catalytic Cracking) or moving bed processes (such as TCC) in which the catalysts continuously circulate between the reaction zone and the regenerator (where it is freed of coke by combustion in the presence of a gas containing oxygen), constituted a great advance over the fixed bed technique. Fluidised bed units (FCC) are now much more widespread than moving bed processes. Cracking is normally carried out at about 500° C. at a total pressure which is close to atmospheric pressure and in the absence of hydrogen.

The prior art is illustrated, for example, in European patent EP-A-0 142 313.

Since the beginning of the 1960s, the most widely used catalysts in cracking units have been zeolites, normally with a faujasite structure. Such zeolites, incorporated in an amorphous matrix, for example constituted by amorphous silica-alumina, and which can contain clays in a variety of proportions, are characterized by hydrocarbon cracking activities which are 1000 to 10000 times higher than those of silica-alumina catalysts which are rich in silica which were used up to the end of the 1950s.

Near the end of the 1970s, the crude oil shortage and the increasing demand for high octane number gasoline led refiners to treat heavier and heavier crudes. Treating these latter constitutes a difficult problem for the refiner because of their high level of catalyst poisons, in particular metallic compounds (especially nickel and vanadium), unusual Conradson carbon numbers and, in particular, asphaltene compounds.

This need to treat heavy feeds and other more recent problems such as the gradual but general removal of lead based additives from gasoline, and the slow but substantial increase in demand for middle distillates (kerosines and gas oils) in some countries have also prompted refiners to research improved catalysts which can in particular satisfy the following aims:

catalysts which are thermally and hydrothermally more stable and more tolerant towards metals;
which can produce less coke for an identical conversion;
which can produce a gasoline with a higher octane number;
which has improved selectivity for middle distillates.

In the majority of cases, the production of light gases comprising compounds containing 1 to 4 carbon atoms per molecule is intended to be minimised and as a consequence, catalysts are designed to limit the production of such light gases.

However, in some particular cases demand for light hydrocarbons containing 2 to 4 carbon atoms per molecule, or some of them such as $C_3$ and/or $C_4$ hydrocarbons, more particularly propylene and butenes, has grown to a substantial level.

The production of a large quantity of butenes is particularly interesting when the refiner can use an alkylation unit, for example for $C_3$–$C_4$ cuts containing olefins, to form an additional quantity of high octane number gasoline.

Thus the global high quality gasoline yield obtained from the starting hydrocarbon cuts is substantially increased.

The production of propylene is particularly desirable in some developing countries where there is a high demand for such a product.

The catalytic cracking process can satisfy this demand to a certain extent provided that, in particular, the catalyst is adapted to such a production. One effective method of adapting the catalyst consists of adding an active agent to catalytic masses, the active agent having the following two qualities:

1. it can crack heavy molecules with good hydrocarbon selectivity for 3 and/or 4 carbon atoms, in particular to propylene and butenes;
2. it must be sufficiently resistant to the severe steam partial pressure and temperature conditions which prevail in the regenerator of the industrial cracker.

SUMMARY OF THE INVENTION

Research work carried out by the inventors on numerous zeolites has led to the surprising discovery that a NU-86 zeolite which is dealuminated and at least partially in its acid form can produce a catalyst with excellent stability which has good selectivity for the production of hydrocarbons containing 3 and/or 4 carbon atoms per molecule. The inventors have discovered that the use of a NU-86 zeolite which is dealuminated and at least partially in its acid form can obtain an FCC additive which is more active and more selective for the production of olefins containing 3 and 4 carbon atoms than NU-86 zeolite, at least partially in its acid form and not having undergone any dealumination treatment.

NU-86 zeolite in its hydrogen form used in the present invention has been described in European patent EP-B1-0 463 786.

The NU-86 zeolite is generally synthesized in the presence of sodium cations and an organic structuring agent which is either octamethonium dibromide or nonamethonium dibromide (EP-B1-0 463 768)

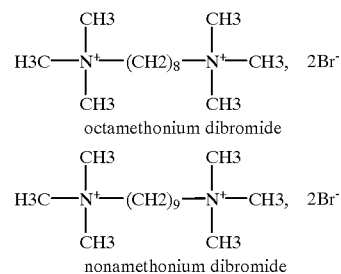

The composition of NU-86 zeolite samples prepared have Si/Al atomic ratios in the range 8.5 to 16 and generally have Na/Al ratios of more than 8%.

The structural type of this zeolite has not yet been officially attributed by the synthesis commission of the IZA (International Zeolite Association). However, following the work published at the 9$^{th}$ International Zeolite Conference by J. L. Casci, P. A. Box and M. D. Shannon ("Proceedings of the 9$^{th}$ International Zeolite Conference", Montreal 1992, Eds R. VonBallmoos et al., 1993, Butterworth), it appears that:

NU-86 zeolite has a three-dimensional microporous system;

the three-dimensional microporous system is constituted by straight channels with a pore opening which is delimited by 11 T atoms (T being a tetrahedral atom principally selected from the group formed by Si, Al, Ga and Fe), straight channels which are alternately delimited by openings with 10 and with 12 T atoms, and sinusoidal channels which are also alternately delimited by openings with 10 and with 12 T atoms.

The term "pore openings with 10, 11 or 12 tetrahedral atoms (T)" means pores constituted by 10, 11 or 12 sides. Determination of the diameter of pores present in the NU-86 zeolite have given the following values: 4.8×5.8 Å for pores with 10 sides, 5.7×5.7 Å for pores with 12 sides and 5.5×6.2 Å for pores with 11 sides. With these pore diameters, NU-86 zeolite belongs in the category of medium pore diameter zeolites.

Further, certain catalytic applications require an adjustment in the thermal stability and acidity of the zeolite to the envisaged reaction. One method for optimising the acidity of a zeolite is to reduce the quantity of aluminum present in its framework. This operation, known as dealumination, has to be carried out with as little destruction of the crystalline structure as possible.

The skilled person is aware that dealumination of the framework of the zeolite leads to a solid which is thermally more stable. However, dealumination treatments undergone by zeolites lead to the formation of extra-framework aluminium species which can block the micropores of the zeolite if they are not eliminated. As an example, this is the case in zeolites used as additives to the catalytic cracking catalyst used in FCC units for the production of olefins. High temperatures of over 600° C. prevail in the cracking unit regenerator and the non negligible steam pressure could lead to dealumination of the zeolite framework and as a result to a loss in acid sites and blocking of the micropores. These two phenomena together lead to a reduction in activity and thus of the efficiency of the zeolite additive.

Controlled dealumination carried out outside the unit can precisely regulate the degree of dealumination of the zeolite framework and can also eliminate extra-framework aluminium species which block the micropores in contrast to that which occurs in the cracking unit, as explained in the preceding paragraph.

The present invention thus provides a process for catalytic cracking of hydrocarbon feeds, characterized by the use of a cracking catalyst comprising at least one NU-86 zeolite which is at least partially, preferably practically completely in its acid form and dealuminated.

The zeolite has generally been dealuminated by at least one heat treatment step, optionally in the presence of steam, followed by at least one acid attack step using at least one solution of a mineral or organic acid, or by at least one acid attack step using at least one solution of a mineral or organic acid.

The dealuminated NU-86 zeolite which is at least partially in its acid form has been described in French patent application 96/14187 of Nov. 19, 1996, a partial description of which is herewith incorporated by way of reference.

The NU-86 zeolite comprised in the catalyst used in the process of the invention comprises silicon and at least one element T selected from the group formed by aluminium, iron, gallium and boron, preferably aluminium. It has a global Si/T atomic ratio of over 20, preferably over 22, and more preferably in the range 22 to 300, still more preferably in the range 22 to 250.

X ray diffraction diagrams of the NU-86 zeolite are given in European patent EP-B1-0 463 768. As is well known to the skilled person, a NU-86 zeolite has the principal X ray diffraction peaks of its structure, but the intensity of these peaks can vary depending on the form of the zeolite without causing doubt as to assigning that zeolite with that structure. Thus the dealuminated NU-86 zeolite of the invention has the principal peaks of its structure as given in European patent EP-B1-0 463 768 with a peak intensity which can be different from that indicated in the cited patent.

When it is comprised in the catalyst of the invention of French patent 96/14187 of Nov. 19, 1998, the NU-86 zeolite is at least partially, preferably practically completely in its acid form, i.e., in its hydrogen (H$^+$) form. The Na/T atomic ratio is generally less than 0.7% and preferably less than 0.6%, more preferably again less than 0.4%.

The global T/Al ratio of the zeolite and the chemical composition of the samples are determined by X ray fluorescence and atomic absorption.

For each sample, the total surface area of the signal over an angular range (2 theta) of 6° to 40° is measured from the X ray diffraction diagrams, then for the same zone, the surface area of the peaks as the number of pulses for a stepwise 3 second recording with a step size of 0.02° (2 theta) was measured. The ratio of these two values, surface area of peaks/total surface area, is characteristic of the quantity of crystalline material in the sample. This ratio of "peak ratio" is then compared for each sample with the peak ratio of a reference sample which is arbitrarily considered to be completely (100%) crystalline. The degree of crystallinity is then expressed as a percentage with respect to a reference, which must be carefully selected, as the relative intensity of the peaks varies depending on the nature, the proportion and position of the different atoms in the structure unit, in particular the cations and the structuring agent. For the examples of the present description, the reference selected is the form of NU-86 which had been calcined in dry air and exchanged three times in succession with an ammonium nitrate solution.

The microporous volume can also be estimated from the quantity of nitrogen adsorbed at 77 K for a partial pressure $P/P_0$ of 0.19, for example.

To prepare the dealuminated NU-86 zeolite in the preferred case where T is Al, two dealumination methods can be used starting from as synthesised NU-86 zeolite comprising an organic structuring agent. However, any other method which is known to the skilled person can also be used.

The first method, direct acid attack, comprises a first calcining step carried out in dry air, at a temperature which is generally in the range 450° C. to 550° C., which eliminates the organic structuring agent present in the micropores of the zeolite, followed by a step in which the zeolite is treated with an aqueous solution of a mineral acid such as $HNO_3$ or HCl or an organic acid such as $CH_3CO_2H$. This latter step can be repeated as many times as is necessary to obtain the desired degree of dealumination. Between these two steps, one or more ion exchange steps can be carried out using at least one $NH_4NO_3$ solution, to at least partially and preferably almost completely eliminate the alkaline cation, in particular sodium. Similarly, at the end of the direct acid attack dealumination step, one or more optional ion exchange steps can be carried out using at least one $NH_4NO_3$ solution to eliminate residual alkaline cations, in particular sodium.

In order to obtain the desired Si/Al ratio, the operating conditions must be correctly selected; the most critical parameters in this respect are the temperature of the treatment with the aqueous acid solution, the concentration of the latter, its nature, the ratio between the quantity of acid solution and the mass of the treated zeolite, the treatment period and the number of treatments carried out.

The second method, heat treatment (in particular using steam, by steaming)+acid attack, comprises firstly calcining in dry air at a temperature which is generally in the range 450° C. to 550° C., to eliminate the organic structuring agent occluded in the microporosity of the zeolite. The solid obtained then undergoes one or more ion exchanges using at least one $NH_4NO_3$ solution, to eliminate at least a portion, preferably practically all of the alkaline cation, in particular sodium, present in the cationic position of the zeolite. The zeolite obtained then undergoes at least one framework dealumination cycle comprising at least one heat treatment which is optionally and preferably carried out in the presence of steam, at a temperature which is generally in the range 550° C. to 900° C., and optionally followed by at least one acid attack using an aqueous solution of a mineral or organic acid. The conditions for calcining in the presence of steam (temperature, steam pressure and treatment period), also the post-calcining acid attack conditions (attack period, concentration of acid, nature of acid used and the ratio between the volume of the acid and the mass of zeolite) are adapted so as to obtain the desired level of dealumination. For the same reason, the number of heat treatment-acid attack cycles can be varied.

In the preferred case when T is Al, the framework dealumination cycle, comprising at least one heat treatment step, optionally and preferably carried out in the presence of steam, and at least one attack step carried out in an acid medium of the NU-86 zeolite, can be repeated as often as is necessary to obtain the dealuminated NU-86 zeolite having the desired characteristics. Similarly, following the heat treatment, optionally and preferably carried out in the presence of steam, a number of successive acid attacks can be carried out using different acid concentrations.

In a variation of this second calcining method, heat treatment of the NU-86 zeolite containing the organic structuring agent can be carried out at a temperature which is generally in the range 550° C. to 850° C., optionally and preferably in the presence of steam. In this case, the steps of calcining the organic structuring agent and dealumination of the framework are carried out simultaneously. The zeolite is then optionally treated with at least one aqueous solution of a mineral acid (for example $HNO_3$ or HCl) or an organic acid (for example $CH_3CO_2H$). Finally, the solid obtained can optionally be subjected to at least one ion exchange step using at least one $NH_4NO_3$ solution, to eliminate practically all of the alkaline cations, in particular sodium, present in the cationic position in the zeolite.

In order to characterise the ability of zeolites comprised in the catalysts used in the catalytic cracking process of the invention to produce light olefins containing 3 and 4 carbon atoms, we have developed a specific catalytic cracking test. This test, which involves the catalytic cracking of methylcyclohexane, can measure hydrogen transfer which characterises the ability of zeolites, in particular dealuminated NU-86 zeolites, but also more generally all molecular sieves to produce or not to produce olefins.

This test involves fixed bed catalytic cracking of methylcyclohexane using zeolites at a temperature of 500° C. at atmospheric pressure. The methylcyclohexane flow rate and the mass of molecular sieves are regulated such that a large conversion range is covered.

We have discovered that measuring the $iC_4/iC_4^=$ molar ratio is an excellent index of the ability of a zeolite to produce olefins. This index, termed the hydrogen transfer index (HTI) characterises hydrogen transfer reactions which are side reactions which saturate the olefins produced by cracking. As a result, this index will be lower when a zeolite transfers little hydrogen and thus produces a lot of light olefins. In general, the $iC_4/iC_4^=$ molar ratio, i.e., the HTI, is measured for a 40% methylcyclohexane conversion, the value obtained is then termed the hydrogen transfer index at 40% methylcyclohexane conversion and is given the symbol $HTI_{40}$. A hydrogen transfer index (HTI) can also be determined for lower or higher conversions, and the different values obtained for the same methylcyclohexane conversion are compared.

Non limiting examples of $HTI_{40}$ for a number of zeolites which are not in accordance with the zeolites used in the processes of the invention are given in Table 1 below.

TABLE 1

| Structural type (zeolite) | $HTI_{40}$ |
| --- | --- |
| FAU (Y Si/Al = 19) | 6.4 |
| MAZZ Omega Si/Al = 17) | 5.7 |
| MOR (Mordenite Si/Al = 18) | 3.6 |
| NU-87 (Si/Al = 17.5) | 2.4 |

This table shows that the HTI depends greatly on the structure of the zeolite and on the fact that Y zeolite leads to a high hydrogen transfer index.

The catalyst used in the process of the present invention may also comprise a Y structure with a faujasite structure ("Zeolite Molecular Sieves: Structure, Chemistry and Uses", D. W. BRECH, J. WILEY and Sons, 1973), as is well known to the skilled person. Of the Y zeolites which can be used, a stabilised Y zeolite generally known as ultrastable or USY zeolite is preferably used, either in its at least partially exchanged form with metallic cations, for example cations of alkaline-earth metals and/or cations of rare earth metals with atomic number 57 to 71 inclusive, or in its hydrogen form.

The catalyst used in the process of the present invention may also comprise at least one matrix, which is normally amorphous or of low crystallinity, generally selected from the group formed by alumina, silica, magnesia, clay, titanium oxide, zirconia and boron oxide.

The catalyst used in the process of the invention generally comprises:

a) 20% to 95% by weight, preferably 30% to 85%, and more preferably 50% to 80%, of at least one matrix;

b) 1% to 60% by weight, preferably 4% to 50%, more preferably 10% to 40%, of at least one Y zeolite with faujasite structure; and c) 0.01% to 30% by weight, preferably 0.05% to 20%, more preferably 0.1% to 10%, of at least one NU-86 zeolite, which is dealuminated and at least partially in its acid form.

The catalyst used in the process of the present invention can be prepared using any of the methods known to the skilled person.

Thus the catalyst can be obtained by simultaneous incorporation of the NU-86 zeolite described above and Y zeolite using conventional methods for preparing cracking catalysts containing a zeolite.

The catalyst can also be obtained by mechanically mixing a first product containing a matrix and a Y zeolite, and a second product comprising the NU-86 zeolite with a matrix which can be identical or different to that contained in the first product. This mechanical mixture is normally formed using dry products. The products are preferably dried by spray-drying, for example at a temperature of 100° C. to 500° C., normally for 0.1 to 30 seconds. After spray drying, these products can still contain about 1% to 30% by weight of volatile material (water and ammonia).

The NU-86 zeolite-matrix mixture normally contains 1% to 90% by weight, preferably 5% to 60% by weight, of NU-86 zeolite with respect to the total weight of the mixture.

The Y zeolite-matrix mixture used to prepare the catalyst used in the process of the present invention is normally a conventional prior art catalytic cracking catalyst (for example a commercially available catalyst); the NU-86 zeolite described above can then be considered as an additive which can be used as it is, with a view to mixing it with the conventional cracking catalyst defined above, or it may already have been incorporated in a matrix, the matrix—NU-86 zeolite ensemble then constituting the additive which is mixed with the conventional catalytic cracking catalyst defined above, after suitable forming, for example by mechanically mixing grains containing the NU-86 zeolite and grains of a conventional cracking catalyst.

Thus in a first implementation of the process of the invention, the cracking catalyst comprises an FCC additive which is NU-86 zeolite formed on a matrix and a conventional cracking catalyst comprising a Y zeolite with a faujasite structure and a matrix. In a second implementation of the process of the invention, the cracking catalyst comprises NU-86 zeolite and Y zeolite formed on the same matrix.

The general conditions for catalytic cracking reactions are well known to the skilled person (see, for example, U.S. Pat. Nos. 3,293,192, 3,449,070, 4,415,438, 3,518,051 and 3,607,043).

With the aim of producing the largest possible quantity of gaseous hydrocarbons containing three and/or four carbon atoms per molecule, in particular propylene and butenes, it is sometimes advantageous to slightly increase the temperature at which cracking is carried out, for example from 10° C. to 50° C. The catalyst used in the process of the present invention is, however, usually sufficiently active for such a temperature increase not to be necessary. The other cracking conditions are unchanged with respect to those used in the prior art. The catalytic cracking conditions are generally as follows:

contact time in the range 1 to 10000 milliseconds;
catalyst to feed weight ratio (C/F) in the range 0.5 to 50;
temperature in the range 400° C. to 800° C.;
pressure in the range 0.5 to 10 bars (1 bar=0.1 MPa).

The following examples illustrate the invention without in any way limiting its scope.

EXAMPLE 1

Preparation of H-NU-86/1 Zeolite

The starting material was a NU-86 zeolite with a global Si/Al atomic ratio of 10.2, and a sodium weight content such that the Na/Al atomic ratio was 30.8%.

This NU-86 zeolite first underwent dry calcining at 550° C. in a stream of dry air for 10 hours. The solid obtained underwent four ion exchange steps in a solution of 10 N $NH_4NO_3$ at about 100° C. for 4 hours for each exchange step. The solid obtained was designated as $NH_4$-NU-86 and had an Si/Al ratio of 10.4 and an Na/Al ratio of 1.3%. The remaining physico-chemical characteristics are shown in Table 2.

TABLE 2

| | | Adsorption | |
|---|---|---|---|
| Sample | X ray diffraction Crystallinity (%) | $S_{BET}$ ($m^2/g$) | $V(P/P_0 = 0.19)$ ml liquid $N_2/g$ |
| $NH_4$—NU-86 | 100 | 427 | 0.17 |

The $NH_4$-NU-86 was then hydrothermally treated in the presence of 100% of steam at 650° C., for 4 hours. The zeolite then underwent acid attack using 7 N nitric acid at about 100° C. for 4 hours to extract the extra-framework aluminium species formed during hydrothermal treatment. The volume V of the nitric acid solution used (in ml) was 10 times the weight W of the dry NU-86 zeolite (V/W=10).

After these treatments, the H-NU-86/1 zeolite in its H form had a global Si/Al atomic ratio of 27.5 and an Na/Al ratio of less than 0.2%. These crystallographic and adsorption characteristics are shown in Table 3 below.

TABLE 3

| | | Adsorption | |
|---|---|---|---|
| Sample | X ray diffraction Crystallinity (%) | $S_{BET}$ ($m^2/g$) | $V(P/P_0 = 0.19)$ ml liquid $N_2/g$ |
| H—NU-86/1 | 100 | 426 | 0.19 |

This table shows that after the steaming and acid attack steps, the NU-86 zeolite retained good crystallinity and still had a relative high specific surface area ($S_{BET}$).

EXAMPLE 2

Preparation of Catalyst C1 in Accordance with the Invention

The H-NU-86/1 zeolite obtained from Example 1 was used to prepare a cracking additive by conventional mixing of 30% by weight of H-NU-86/1 zeolite in its dry hydrogen form with 70% by weight of amorphous silica, which had been calcined and which had a grain size which was comparable to that of the H-NU-86/1 in its hydrogen form.

The additive obtained was pelletized, then reduced to small aggregates using a crusher. The fraction of grains with a size in the range 40 μm to 200 μm was then recovered by sieving. This additive was termed A1 and thus contained 30% by weight of H-NU-86/1 zeolite.

This additive then underwent hydrothermal treatment at 750° C. for 4 hours in the presence of 100% of steam. Additive A1 thus obtained was mechanically mixed with a CAT catalyst which contained a silica-alumina matrix and 30% by weight of an ultrastable Y zeolite (USY) with a lattice parameter of 24,26 Å, to obtain a catalyst C1.

EXAMPLE 3

Preparation of H-NU-86/2

The starting material was the same NU-86 zeolite as that used in Example 1. Firstly, this NU-86 zeolite underwent dry calcining at 550° C. in a stream of dry air and nitrogen for 10 hours. The solid obtained then underwent ion exchange in a 10 N $NH_4NO_3$ solution at about 100° C. for 4 hours. This operation was repeated three times in succession. The NU-86 zeolite then underwent treatment with a 2 N nitric acid solution at about 100° C. for 5 hours. The volume V of the nitric acid solution used (in ml) was 10 times the weight W of the dry NU-86 zeolite (V/W=10).

After these treatments, the zeolite obtained was designated as H-NU-86/2. It was in its H form and had a global Si/Al atomic ratio of 26.2 and an Na/Al ratio of 0.6%. These crystallographic and adsorption characteristics are shown in Table 4 below.

TABLE 4

| Sample | X ray diffraction Crystallinity (%) | $S_{BET}$ (m$^2$/g) | Adsorption V(P/P$_0$ = 0.19) ml liquid N$_2$/g |
|---|---|---|---|
| H—NU-86/2 | 100 | 496 | 0.22 |

EXAMPLE 4

Preparation of Catalyst C2 in Accordance with the Invention

The H-NU-86/2 zeolite obtained from Example 3 was used to prepare an additive A2 and a catalyst C2 using the same procedure as that described for Example 2.

EXAMPLE 5

Preparation of H-NU-86/3

The starting material was the same NU-86 zeolite as that used in Example 1. Firstly, this NU-86 zeolite underwent dry calcining at 550° C. in a stream of dry air and nitrogen for 10 hours. The solid obtained then underwent ion exchange in a 10 N NH$_4$NO$_3$ solution at about 100° C. for 4 hours. This operation was repeated three times in succession. The NU-86 zeolite then underwent treatment with a 8.5 N nitric acid solution at about 100° C. for 5 hours. The volume V of the nitric acid solution used (in ml) was 10 times the weight W of the dry NU-86 zeolite (V/W=10).

After these treatments, the zeolite obtained was designated as H-NU-86/3. It was in its H form and had a global Si/Al atomic ratio of 40.3 and an Na/Al ratio of 0.15%. These crystallographic and adsorption characteristics are shown in Table 5 below.

TABLE 5

| Sample | X ray diffraction Crystallinity (%) | $S_{BET}$ (m$^2$/g) | Adsorption V(P/P$_0$ = 0.19) ml liquid N$_2$/g |
|---|---|---|---|
| H—NU-86/3 | 98 | 469 | 0.21 |

EXAMPLE 6

Preparation of Catalyst C3 in Accordance with the Invention

The H-NU-86/3 zeolite obtained from Example 5 was used to prepare an additive A3 and a catalyst C3 using the same procedure as that described for Example 2.

EXAMPLE 7

Preparation of Catalyst C4, Not in Accordance with the Invention

The NU-86 zeolite used in this example was the NH$_4$-NU-86 zeolite prepared in Example 1 of the present invention. In this example, however, the NU-86 zeolite did not undergo dealumination.

The non-dealuminated H-NU-86 zeolite used as the starting product in Example 1 was then used to prepare a catalyst C4 using the same procedure as that described from Example 2.

EXAMPLE 8

Evaluation of Hydrogen Transfer of Additives A1, A2 and A3, in Accordance with the Invention, and A4, Not in Accordance with the Invention Catalytic evaluations of the additives were carried out in a fixed bed under atmospheric pressure and at a temperature of 500° C. The feed used was methylcyclohexane. The methylcyclohexane was introduced into the reactor diluted with nitrogen in a N$_2$/HC molar ratio of 12 and at a flow rate such that conversion was 40% by weight of the conversion.

Values for the hydrogen transfer indices obtained for additives A1, A2, A3 and A4 are shown in Table 6 below.

TABLE 6

| Additives | HTI |
|---|---|
| A1 | 0.65 |
| A2 | 0.60 |
| A3 | 0.55 |
| A4 | 1.8 |

The values obtained show that dealumination treatments carried out on NU-86 zeolites lead to solids which produce fewer hydrogen transfer reactions than the non dealuminated zeolite.

EXAMPLE 9

Evaluation of Catalytic Properties for Cracking a Real Feed in a MAT Unit, Using Catalysts C1, C2, C3, in Accordance with the Invention, and Catalyst C4, Not in Accordance with the Invention The cracking reaction was carried out in a MAT unit on a vacuum gas oil type feed, the characteristics of which are given below.

Density, 60° C. 0.918

Refractive index at 67° C. 1.4936

Aniline point, °C. 76

Sulphur, weight % 2.7

The cracking temperature was 520° C. Table 7 shows values for the catalytic properties of catalysts C1 to C4.

TABLE 7

| Cracking a vacuum gas oil using catalysts C1, C2, C3, C4 | | | | |
|---|---|---|---|---|
| | C1 | C2 | C3 | C4 |
| C/F | 0.7 | 0.9 | 1.1 | 0.5 |
| % conversion | 86 | 85 | 86 | 88 |
| C1–C4 gas, wt % | 27 | 29.8 | 33.1 | 25 |
| Gasoline, wt % | 46.2 | 44.3 | 42.1 | 48.7 |
| Gas oil, wt % | 9.1 | 8.6 | 7.5 | 10.2 |
| Coke, wt % | 2.8 | 2.9 | 2.7 | 3.1 |

TABLE 7-continued

Cracking a vacuum gas oil using catalysts C1, C2, C3, C4

|  | C1 | C2 | C3 | C4 |
|---|---|---|---|---|
| C3=, wt % | 6.3 | 6.9 | 8.2 | 5.7 |
| ΣC4=, wt % | 7.2 | 7.8 | 9.4 | 6.4 |

Gasoline (wt %): Represents the percentage by weight of liquid compounds formed during the cracking test and wherein the boiling points are in the range 160° C. to 221° C.
Gas oil (wt %): Represents the percentage by weight of liquid compounds formed during the cracking test and in which the boiling points are in the range 221° C. to 350° C.
Coke (wt %): Represents the percentage by weight of compounds in which the boiling points are over 350° C.
C3= (wt %): Represents the percentage of olefins containing 3 carbon atoms (propylene) formed during the cracking test.
ΣC4= (wt %): Represents the percentage of olefins containing 4 carbon atom formed during the cracking test.

Catalysts C1, C2, C3, in accordance with the invention, at iso-conversion or iso-coke, produced higher results than catalyst C4, which was not in accordance with the invention. Further, these gases produced with catalysts C1, C2, C3 were more olefinic than those produced with catalyst C4. The influence of the HTI on the production of light olefins during cracking of a real feed is thus particularly clear.

What is claimed is:

1. A process comprising catalytically cracking a hydrocarbon feed, in contact with a cracking catalyst comprising at least one NU-86 zeolite which is at least partially in its acid form and at least partially dealuminated, so as to provide a Si/Al atomic ratio of more than 20 up to 300 in the framework of said NU-86 zeolite.

2. A process according to claim 1, in which the global Si/Al atomic ratio of the zeolite is more than 22.

3. A process according to claim 1, in which the global Si/Al atomic ratio of the zeolite is in the range 22 to 300.

4. A process according to claim 1, in which said zeolite is completely in its acid form.

5. A process according to claim 1, in which said catalyst also comprises at least one matrix.

6. A process according to claim 5, in which said matrix is selected from the group consisting of alumina, silica, magnesia, clay, titanium oxide, zirconia and boron oxide.

7. A process according to claim 1, in which the catalyst also comprises a Y zeolite with a faujasite structure.

8. A cracking process according to claim 1, said cracking catalyst comprising:
a) 20% to 95% by weight of at least one matrix;
b) 1% to 60% by weight of at least one Y zeolite with a faujasite structure; and
c) 0.01% to 30% by weight of said at least one NU-86 zeolite which is at least partially dealuminated and at least partially in its acid form.

9. A process according to claim 8, in which the catalyst comprises said NU-86 zeolite formed on a matrix, and said Y zeolite with a faujasite structure formed on a matrix.

10. A process according to claim 8, in which the catalyst comprises said NU-86 zeolite and said Y zeolite, formed on the same matrix.

11. A process according to claim 1, wherein the NU-86 zeolite has been dealuminated from a starting NU-86 zeolite having a Si/Al atomic ratio of about 10.

12. A process according to claim 7, said process being an FCC cracking process.

13. A process according to claim 8, said process being an FCC cracking process.

14. A process according to claim 9, said process being an FCC cracking process.

15. A process according to claim 10, said process being an FCC cracking process.

16. A process according to claim 13, wherein the catalyst comprises on a percent by weight basis: (a) 30–85 of said at least one matrix, (b) 4–50 of said at least one Y zeolite and (c) 0.05–20 of said at least one NU-86 zeolite.

17. A process according to claim 13, wherein the catalyst comprises on a percent by weight basis: (a) 50–80 of said at least one matrix, (b) 10–40 of said at least one Y zeolite and (c) 0.1–10 of said at least one NU-86 zeolite.

18. A process according to claim 3, wherein the Si/Al atomic ratio of the NU-86 zeolite is at least about 40.

19. A process according to claim 17, wherein the Si/Al atomic ratio of the NU-86 zeolite is at least about 40.

* * * * *